April 21, 1964     L. S. MORTENSEN     3,129,958
COMBINATION TRUCK
Filed Nov. 24, 1961
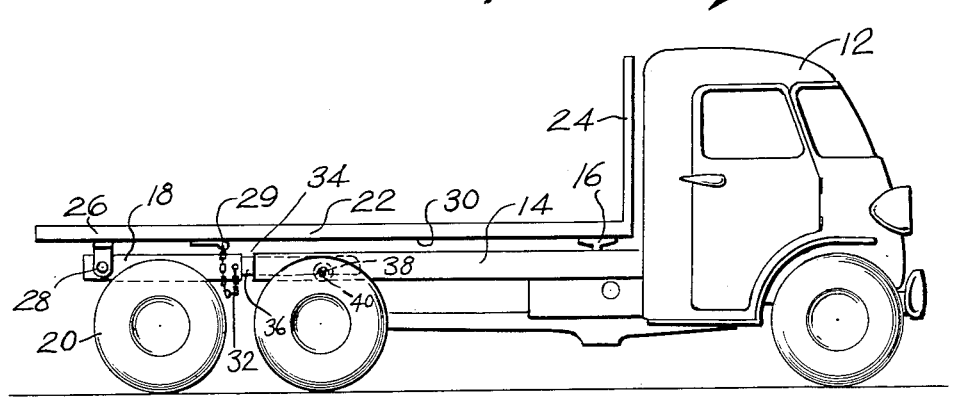
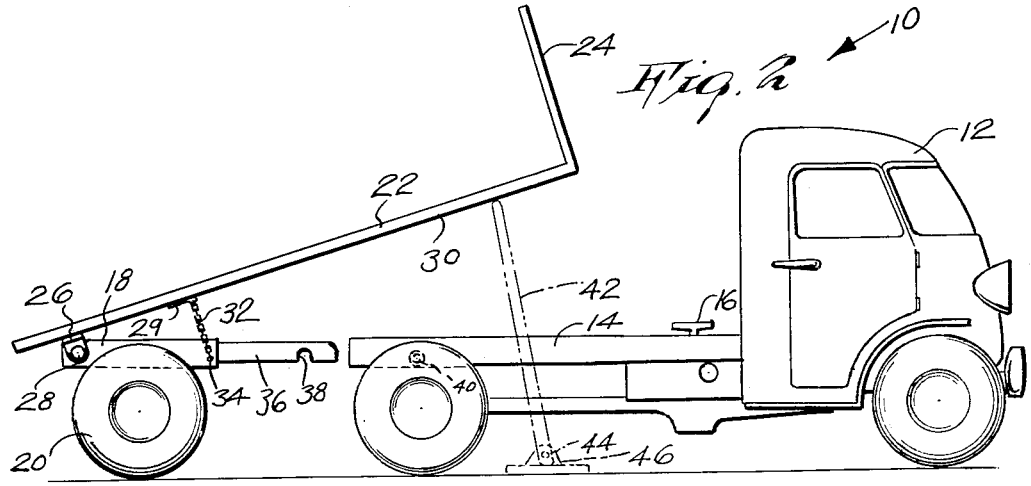
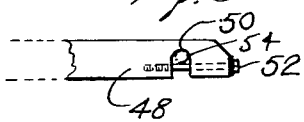
INVENTOR.
LARS S. MORTENSEN

United States Patent Office 3,129,958
Patented Apr. 21, 1964

3,129,958
COMBINATION TRUCK
Lars S. Mortensen, 84 Orchard St., Helper, Utah
Filed Nov. 24, 1961, Ser. No. 154,446
4 Claims. (Cl. 280—418)

This invention relates to improvements in trucks and more particularly to multi-purpose trucks.

It is an object of the present invention to provide a combination truck that can be used for small jobs as well as large jobs.

Another object of the present invention is to provide a combination truck that will substantially reduce wear on one set of tires.

Other objects of the invention are to provide a combination truck bearing the above objects in mind that is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a side view of the invention in assembled position relative to a truck;

FIG. 2 is a side view of the invention showing the device disassembled; and

FIG. 3 is an enlarged view of a modified form of locking means for the present invention.

Referring now more in detail to the drawing, a truck 10 made in accordance with the present invention is shown to include a main chassis 14 of substantially rectangular configuration, having at its forward end a substantially raised cross bar 16 fixedly secured between the chassis side walls. A substantially rectangular sub-chassis 18 having therebeneath axle means fixedly secured thereto a pair of wheels 20 is pivotally secured to the flat bed 22 having at its foremost end a substantially perpendicular back 24 extending substantially upwardly. A pair of spaced apart brackets 26 are fixedly secured therebeneath and substantially rearwardly to bed 22 and pivotally receive a pair of pins 20 therethrough that are fixedly secured to the outermost ends externally of sub-chassis 18.

A pair of spaced apart brackets 29 are fixedly secured to the underside surface 30 of bed 22 and are fixedly secured to a substantially predetermined length of spaced apart chains 32. At the ends of chains 32 are secured fasteners 34 which are fixedly secured to subchassis 18, thus limiting the arc attainable by bed 22. A pair of spaced apart elongated bars 36 fixedly secured to the foremost ends of chassis 18 having a pair of semi-circular recesses 38 are dropped therewithin chassis 14. And openings 38 are received and retained by substantially perpendicular chassis pins 40. The undersurface 30 of bed 22 rests in abutment with cross bar 16 of sub-chassis.

For assembly and disassembly of sub-chassis 18 therewith chassis 14 a jack 42 of substantially elongated configuration by a pivotal pin 44 therethrough is substantially central of base member 46 and while during assembly or disassembly is slidably engaged with the undersurface 30 of bed 22.

A modified form of fastening of the chassis and sub-chassis pin combination is shown to include a pair of sub-chassis 48 of substantially rectangular configuration having a substantially U-shaped pair of openings 50 which longitudinally receive thereacross a fastening bolt 52 which thus retains pin 54, thus locking the sub-chassis to the main chassis.

In operation, a truck bed of suitable length for the load desired to be carried is urged toward the chassis 14 while jack member 42 adjusts accordingly until alignment of bars 36 with chassis 14 with chains 32 serve the limit the angular position of bed 22 which is pivotal about pins 28 and as the bars 36 fall in place over pins 40, thus securing sub-chassis 18 therewithin the main chassis 14 after which the jack member 42 is then removed.

It will thus be noted that the exact reverse procedure of the aforementioned is true when disassembly is desired.

While various changes may be made in the detail construction, it shall be understood that such changes shall be within the spirit and scope of the present invention as defined by the appended claims.

What I claim as new and desire to protect by Letters Patent of the United States is:

1. A combination truck comprising, in combination, a cab, a chassis secured to said cab, a sub-chassis assembly supported by wheel means, said sub-chassis received within said main chassis, said main chassis receiving said sub-chassis comprising a pair of spaced apart locking pins perpendicular to said chassis, said locking pins receiving a pair of spaced apart semi-circular openings in locking engagement with said sub-chassis, a substantially raised cross bar between side channel members of said main chassis supporting in abutment therewith a flat bed, said flat bed having an upwardly substantially vertical back member, said flat bed receiving at its rearmost underside a pair of parallel spaced apart brackets, said brackets pivotable about a pair of external pins on said sub-chassis, said pivotable brackets being located rearward of said wheel means.

2. The combination according to claim 1 wherein said pivotable motion about said pins is limited by a pair of parallel spaced apart chains, said chains secured by fastening means to said sub-chassis near the foremost end, and the other end of said chains secured to the underside of said flat bed by a pair of parallel spaced apart bracket means.

3. The combination according to claim 2 wherein said bed member is substantially supported and adjusted by jack means slidable on the undersurface of said bed.

4. The combination according to claim 3 wherein modified locking means of said sub-chassis to said main chassis comprises U-shaped openings in said sub-chassis receiving pins retained in said openings substantially secured by bolt fastening means.

References Cited in the file of this patent

UNITED STATES PATENTS

| | | |
|---|---|---|
| 1,155,713 | Eldridge | Oct. 5, 1915 |
| 2,057,655 | Anthony et al. | Oct. 20, 1936 |
| 2,539,733 | Dorsey | Jan. 30, 1951 |